Nov. 3, 1925.  1,560,098
E. O. POWERS
COMBINED POWER TRANSMITTING AND STEERING GEAR MECHANISM
Filed Feb. 17, 1919    3 Sheets-Sheet 1
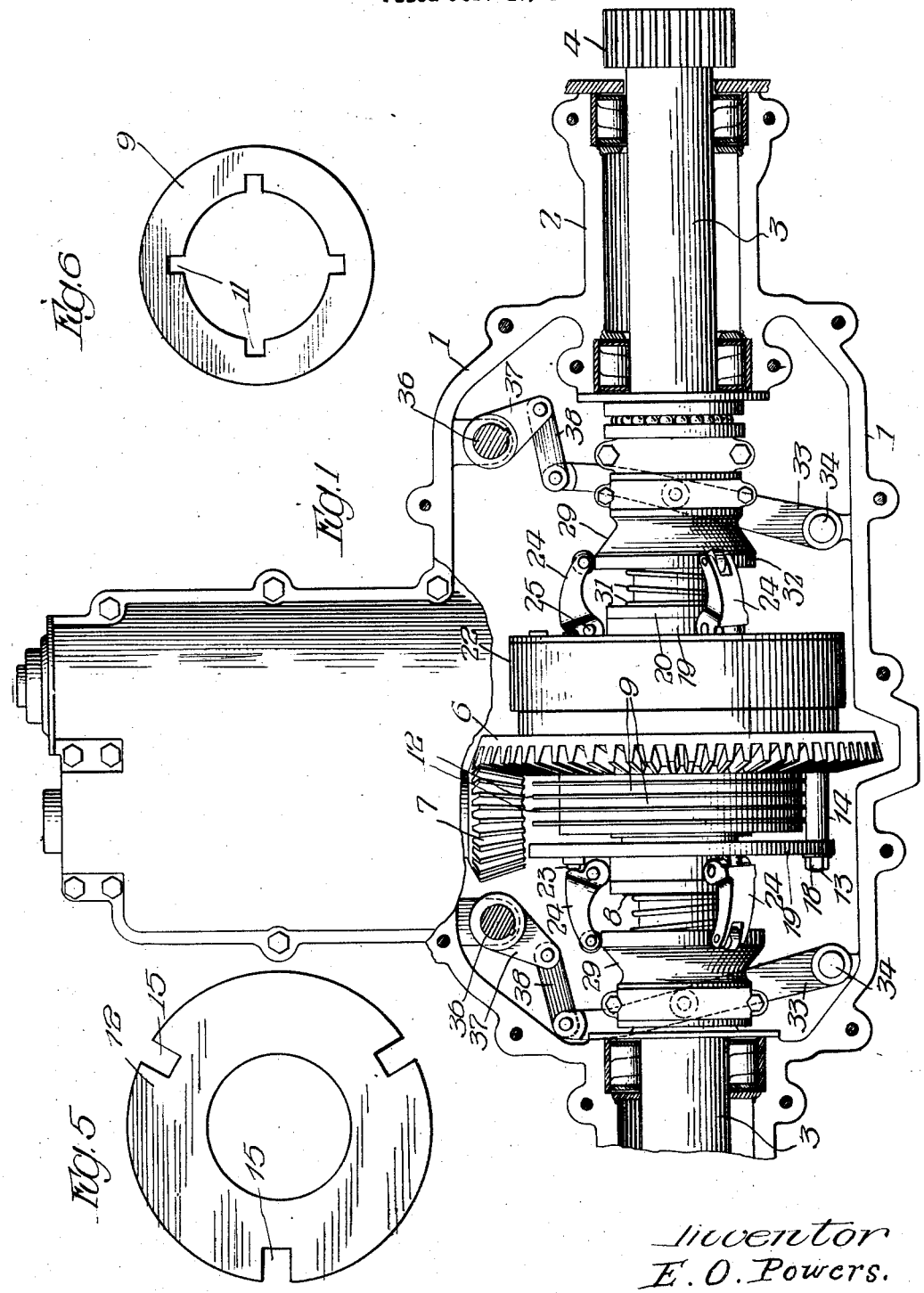
Inventor
E. O. Powers.
By Arthur F. Durand
Atty.

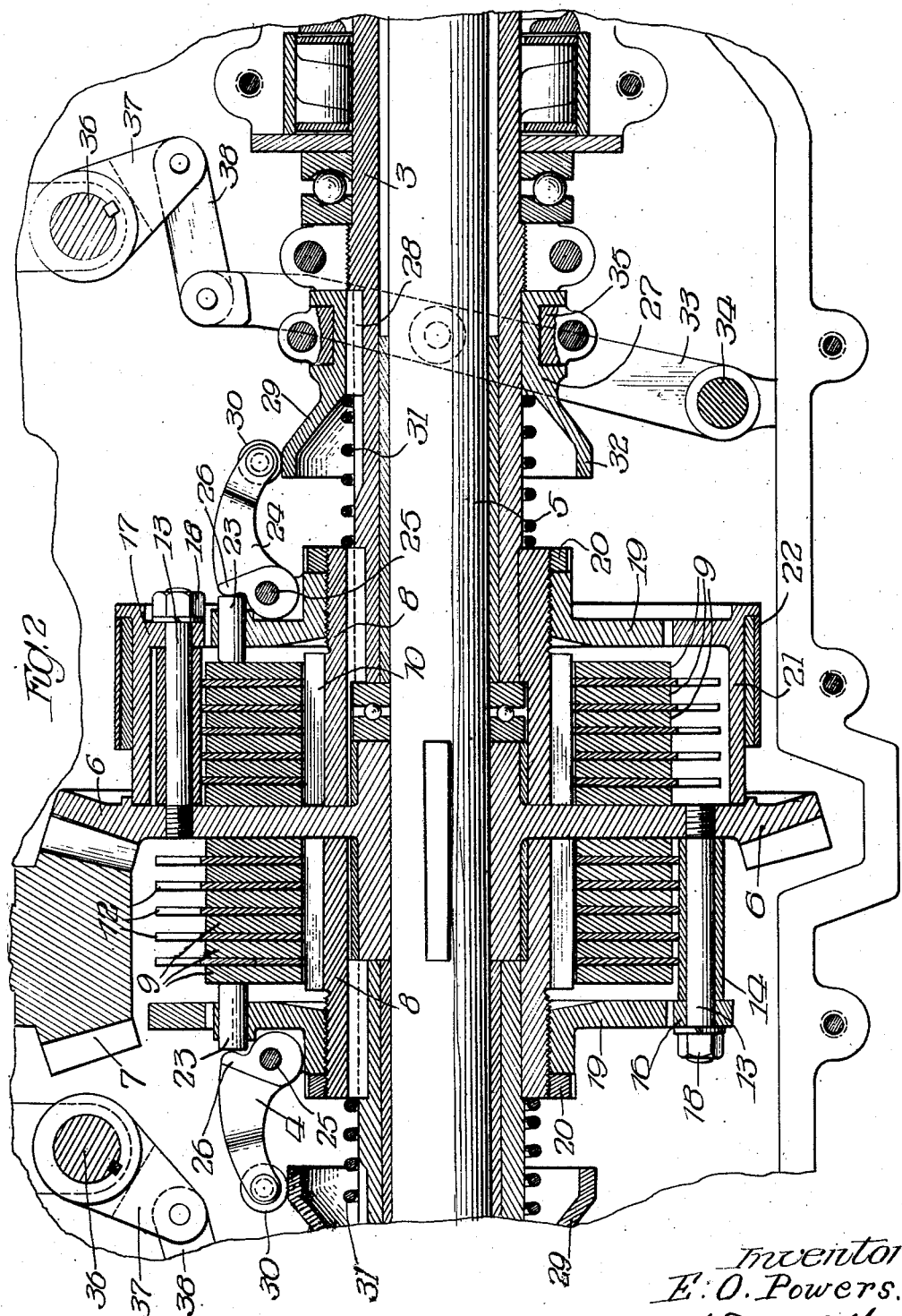

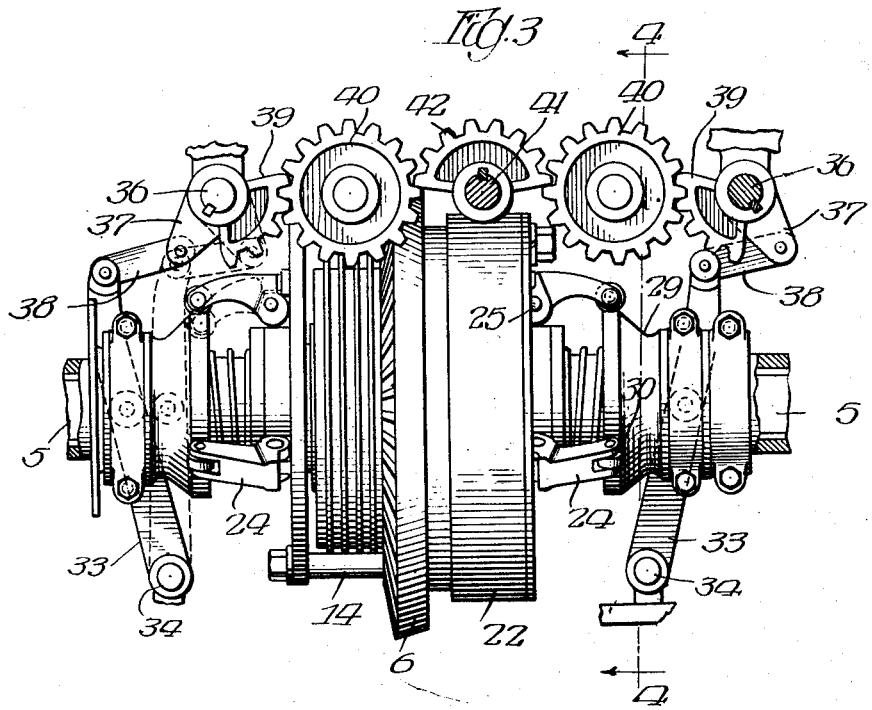
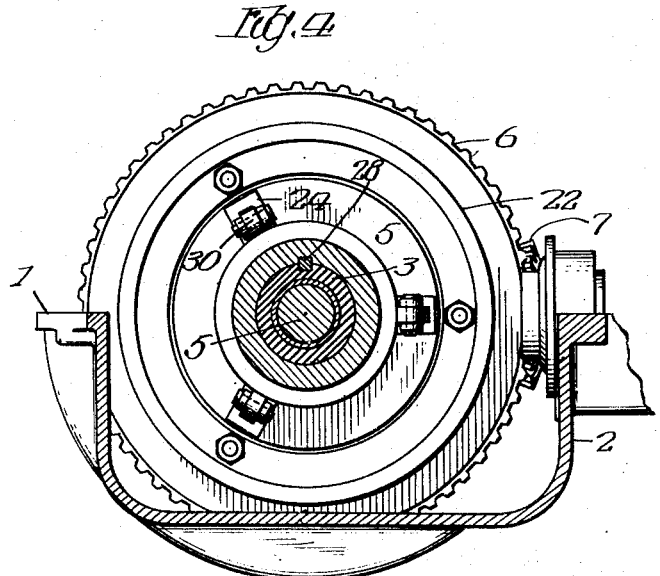

Patented Nov. 3, 1925.

1,560,098

UNITED STATES PATENT OFFICE.

EDWARD O. POWERS, OF CHICAGO, ILLINOIS, ASSIGNOR, BY MESNE ASSIGNMENTS, TO F. C. AUSTIN MACHINERY COMPANY, A CORPORATION OF ILLINOIS.

COMBINED POWER-TRANSMITTING AND STEERING-GEAR MECHANISM.

Application filed February 17, 1919. Serial No. 277,443.

*To all whom it may concern:*

Be it known that I, EDWARD O. POWERS, a citizen of the United States of America, and a resident of Chicago, Illinois (where I am now living and receive mail, c/o F. C. Austin, 609 Railway Exchange Building), have invented a certain new and useful Improvement in Combined Power-Transmitting and Steering-Gear Mechanism, of which the following is a specification.

This invention relates to power transmitting and steering gear mechanism of the kind ordinarily employed on tractors, or on similar self-propelled vehicles, in which the construction is such that the steering of the vehicle is accomplished by causing the traction means at one side to travel faster than at the other side, or by causing the multipedal or endless traction belt at one side to stop, so that the propelling power is limited to one side of the vehicle, and whereby the tractor or other vehicle will immediately turn around or begin traveling in a circle. This has been accomplished, for example, by providing a pair of clutches, one for each side of the tractor or other vehicle, the two clutches being normally closed, and means being provided for opening either clutch to stop the transmission of power to that side of the vehicle, whereby the continued operation of the multi-pedal or traction belt at the other side will turn the machine around, or cause it to travel to the right or the left, at the will of the driver or operator.

Generally stated, the object of the invention is to provide an improved construction and arrangement whereby the said clutches are arranged in a more satisfactory manner, and adapted to control the transmission of power to the opposite sides of the tractor in a more efficient and effective manner, with less danger of breakage, and whereby the entire mechanism is stronger and more compact in form, being somewhat similar in general shape and arrangement to the differential gearing heretofore employed for this purpose.

It is also an object to provide certain details and features of construction and combinations tending to increase the general efficiency and the desirability of a combined power transmitting and steering gear mechanism of this particular character.

To these and other useful ends the invention consists in matters hereinafter set forth and claimed.

In the accompanying drawings—

Fig. 1 is a plan of a combined power transmitting and steering gear mechanism embodying the principles of the invention, with one end portion thereof broken away for convenience of illustration, and with certain other parts omitted to bring into view the details of construction below.

Fig. 2 is an enlarged longitudinal horizontal section of the central portion of said mechanism.

Fig. 3 is a plan of the central portion of the mechanism shown in Fig. 1, on the same scale, but with certain other parts not shown in Fig. 1 included.

Fig. 4 is a section on line 4—4 in Fig. 3.

Fig. 5 is a detail view of one of the rings included in the construction of the friction clutch mechanism.

Fig. 6 is a similar view of another ring of said mechanism.

As thus illustrated, the invention comprises a gear casing 1 of any suitable character, provided at opposite sides thereof with tubular bearings 2 for the long sleeves 3 which rotate therein, and which are provided at their outer ends with the pinions 4, the one at the left hand side of Fig. 1 being omitted for convenience of illustration, but it will be understood that the portion shown broken away in this figure is exactly like the one shown at the right of the drawing, the two pinions being employed for connecting the sleeves with the multipedal belts or other traction means of the tractor. A solid or one piece shaft 5 extends through the two sleeves, from one pinion 4 to the other, and rotates in unison with the two sleeves while the tractor is traveling straight ahead, as will hereafter more fully appear. A bevel gear 6 is keyed to the shaft 5 to engage the bevel pinion 7 by which the mechanism is driven, it being understood that this pinion 7 is driven through a suitable connection with the engine of the tractor. The cylindric collars 8 are keyed respectively to the sleeves 3, at opposite sides of the bevel gear 6, and the relatively thick rings 9 are in turn keyed to said collars, as by splines or keys 10, in any suitable manner, said rings having notches 11 for this purpose. The intermediate and thinner rings 12 are keyed by bolts 13 to the bevel gear 6, these bolts having sleeves 14 which engage the notches 15 in said rings 12, and the sleeves 14 being compressed endwise by the rings 16 and 17 which are clamped in place by the nuts 18 on the outer ends of said bolts. The flanges 19 are screwed upon the threaded outer end portions of the collars 8, and held thereon by lock-nuts or threaded rings 20, so that these flanges 19 are adjustable toward and away from each other. The ring 17 is integral with the cylindric or drum portion 21 upon which is carried the friction brake strap 22, which latter can be operated by any suitable means, thereby to retard the transmission of the driving power when such is necessary or desirable. The flanges 19 are provided with short pins 23 which extend parallel with the shaft 5, and which bear against the outermost rings 9 at opposite sides of the clutch mechanism. Levers 24 are pivoted at 25 on the flanges 19, said levers being provided with cam portions 26 to engage said pins 23 for the purpose of crowding the rings 9 and 12 tightly together, thereby causing the sleeves 3 to rotate in unison with the shaft 5 to drive the tractor straight ahead. Collars 27 are secured to the sleeves 3 by splines 28, so that these collars can slide toward and away from each other on the sleeves. Each collar 27 has a flared portion 29 to serve as a cam for engaging the rollers 30 on the levers 24, so that when the collars 27 are moved away from each other the rollers 30 are moved away from the shaft 5, thus causing the pins 23 to compress the friction rings of the clutches, in the manner stated. Springs 31 are interposed between the collars 27 and the collars 8, and the rollers normally engage the cylindric portions 32 at the outer edges of the tapered or cam-like portions 29, so that the clutches are normally closed; but if either collar 27 is moved toward the bevel gear 6, the levers 24 adjacent to the adjusted collar will be allowed to move toward the shaft, with the result that the pins 23 engaging these levers will move outwardly, thus relaxing the compression of the rings 9 and 12 at one side of the bevel gear, and thereby interrupting the transmission of power from the bevel gear to the sleeve 3 which carries the clutch mechanism affected by this adjustment. Thus either clutch can be opened to cause the tractor or other vehicle to turn to the right or the left, or to travel in a circle, or to turn clear around.

Any suitable devices can be employed for controlling the two friction clutches thus provided. As shown, said devices include a pair of levers 33 pivoted at 34 on some adjacent portion of the gear casing, and provided with yokes or rings 35 which engage the collars 27, whereby pivotal motion of these two levers will slide the splined collars 27 back and forth on their sleeves 3, in the manner explained. Vertically disposed rock shafts 36 are provided and mounted in suitable bearings on the gear casing and said rock shafts have crank arms 37 which are connected by links 38 with the other ends of said levers 33, it being understood that the latter are four in number and are horizontally disposed within the gear casing, above and below the shaft 5 and sleeves 3, so that they swing back and forth above and below the power transmitting connections. Segment gears 39 are also mounted on the shafts 36, and are arranged to engage the gears 40, which latter are idlers. The vertically disposed steering shaft 41 can be supported and arranged in any suitable manner on the tractor or vehicle, and is provided near its lower end with a segmental gear 42 for engaging the gears 40, whereby the latter may be rotated to control the two clutches. With this arrangement, rotation of the steering shaft 41 to the right will operate the gear 40 at the right, causing the clutch at the right hand side, which is within the brake band 22, to be opened in the manner explained, so that the tractor or vehicle will immediately turn to the right; but the gear 40 at the left will not be operated, because of the segmental character of the gear 42, operating in a manner that will be readily understood, so that the clutch at the left hand side of the machine will remain closed. The opposite effect will be produced, of course, by rotation of the shaft 41 to the left, and by this the machine will be steered or turned to the left, inasmuch as the left hand clutch will be opened while the right clutch will remain closed.

By means of screw threaded connections between the flanges 19 and their collars 8, and the lock-nuts 20, previously described, the mechanism can be adjusted to take up wear when the rings 9 and 12 become worn, in a manner that will be readily understood; but this will not affect the operativeness of the cams 29, inasmuch as the straight cylindric portions 32 are of sufficient length to allow for the adjustment of the flanges 19 toward the bevel gear 6, when it is necessary to take up wear. The rings 9 and 12 can be made of any suitable material, such as metal or fiber or any of the other materials ordinarily employed in friction clutches of this general character.

With the foregoing construction and arrangement, it will be seen that the entire clutch mechanism, by which the power transmitting connections are employed for the additional purpose of controlling the vehicle, and for steering it to the right or the left, takes the general form, to some extent, of the ordinary differential gearing, and is all compactly enclosed within the gear casing. The two friction clutches thus disposed at opposite sides of the bevel gear 6, which latter and its driving pinion 7 are of the kind ordinarily employed in certain kinds of transmission gears, are easily controlled by the driver or operator to steer the machine. Both clutches are normally closed, so that the tractor or other vehicle will travel straight ahead, but by opening one clutch, or by partially relaxing the compression of its friction rings, so as to allow more or less for slippage, the machine may be turned to the right or the left. The combined power transmitting and steering gear mechanism of this kind can be used, for example, in tractors of that kind in which the entire machine is supported by multi-pedal or endless traction belts, but the invention is not limited to a tractor or vehicle of any particular character, and may be used in any self-propelled vehicle in which the construction is such that the steering, either wholly or in part, is accomplished through control exercised over the power transmitting mechanism, and by the unbalancing of the transmission, so to speak, thereby to cause the traction means at one side to travel faster than at the other side, or to cause the traction means at one side to stop entirely, thus causing the traction means at the other side to continue in operation, and to thereby swerve the machine to the right or the left at the will of the operator or driver.

With the construction shown and described, the shaft 5, it will be seen, is rotatable in unison with the two sleeves 3, or with either sleeve while rotating in the other, depending upon which sleeve is allowed to remain stationary. Thus the shaft is supported by sleeves which not only constitute a part of the power transmitting mechanism, but which also constitute bearings for the shaft, while the sleeves are supported in bearings of their own, on the chassis or body frame. To control the clutches, the levers 24 are moved outwardly away from the shaft 5 to close the clutches, and the springs 31 tend constantly to do this, whereby it is necessary to compress these springs in the opening of the clutches. With the two sleeves, and the one piece shaft extending from the outer end of one sleeve to the outer end of the other, in the manner explained, the advantages of a divided axle and a solid or one piece axle are obtained and combined in one and the same structure, thus insuring maximum strength and rigidity throughout the entire structure.

What I claim as my invention is:—

1. In a self-propelled vehicle, a combined driving and steering mechanism, comprising a shaft, sleeves on said shaft, a rotary member fixed on said shaft between said sleeves a pair of clutches to connect said sleeves with said member, devices to control said clutches independently of each other so that said shaft is rotatable in either sleeve while rotating with the other sleeve when the vehicle is steered to the right or left, bearings to support said shaft and sleeves, and means to transmit power from said sleeves for driving and steering purposes, said devices comprising a pair of levers connected to operate said clutches, a shaft, cranks to operate said levers, and gearing to connect said shaft with said cranks, said clutches being normally closed, part of said gearing being operable to open one clutch alone when said shaft is turned to the right and the other part of the gearing being operable to open the other clutch alone when said shaft is turned to the left.

2. In a self-propelled vehicle, a combined driving and steering unit, comprising a gear casing, a driven shaft extending transversely through said casing, a continuously driven gear fixed to said shaft, driving sleeves on opposite ends of the shaft, each of said sleeves having means thereon for transmitting driving power to one side of the vehicle, and clutch mechanism for connecting said sleeves individually with said gear to selectively transmit power to one or both sides of the vehicle, said mechanism comprising separate sets of friction clutch members for connecting each of said sleeves to said gear, separate operating parts for each of said sets of friction members, said parts including a pivoted cam lever and a conical member slidable upon one of the sleeves for moving said lever to and from the sleeve to engage and disengage said friction members, means for shifting the conical member upon said sleeve, and a single control for the shifting means on both of said sleeves, said control comprising a steering shaft and means whereby rotation of said shaft in one direction operates the clutch upon one sleeve and rotation in the opposite direction operates the clutch on the other sleeve.

EDWARD O. POWERS.